United States Patent Office 3,517,001
Patented June 23, 1970

3,517,001
NITROGEN-CONTAINING ORGANOSILICON
MATERIALS
Abe Berger, Schenectady, N.Y., assignor to General
Electric Company, a corporation of New York
No Drawing. Filed Sept. 20, 1967, Ser. No. 669,284
Int. Cl. C07d 55/38
U.S. Cl. 260—248                                         4 Claims

ABSTRACT OF THE DISCLOSURE

Silicon substituted isocyanurates of the formula,

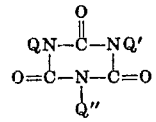

can be made by effecting addition of a silicon hydride to an aliphatically unsaturated isocyanurate, where Q is selected from monovalent organosilicon radicals, Q' is selected from Q radicals, monovalent saturated hydrocarbon radicals, halogenated monovalent saturated hydrocarbon radicals, monovalent aliphatically unsaturated hydrocarbon radicals and halogenated monovalent aliphatically unsaturated hydrocarbon radicals, and Q" is selected from Q or Q' radicals. These materials can be employed as primers for promoting the adhesion of silicone rubber to various substrates.

---

The present invention relates to certain silicon-substituted isocyanurates and a method for making these materials.

The silicon-substituted isocyanurates, hereinafter referred to as the "silylisocyanurates, or monosilylisocyanurate, disilylisocyanurates, or trisilylisocyanurate" have the formula, (1)

$$(RO)_{3-a}R'_aSi''N-\overset{O}{\overset{\|}{C}}-NG$$
$$O=C-N-C=O$$
$$\underset{G}{|}$$

where R is an alkyl radical having from 1 to 8 carbon atoms, R' is a member selected from monovalent saturated hydrocarbon radicals and halogenated monovalent saturated hydrocarbon radicals, R" is selected from divalent saturated hydrocarbon radicals and halogenated divalent saturated hydrocarbon radicals, G is selected from R' radicals, $(RO)_{3-a}R'_aSiR''$ radicals, aliphatically unsaturated monovalent hydrocarbon radicals, and halogenated aliphatically unsaturated monovalent hydrocarbon radicals, and $a$ is a whole number equal to 0 to 3, inclusive.

Radicals included by R of Formula 1 are alkyl radicals such as methyl, ethyl, propyl, butyl, pentyl, hexyl, heptyl, octyl, etc. Radicals included by R' are, for example, aryl radicals and halogenated aryl radicals such as phenyl, tolyl, chlorophenyl, xylyl, napthyl, chloronapthyl, etc.; aralkyl radicals such as phenylethyl, benzyl, etc.; alkyl radicals and chloroalkyl radicals such as methyl, ethyl, propyl, chloropropyl, trifluoropropyl, butyl, etc; cycloalkyl radicals such as cyclobutyl, cyclopentyl, cyclohexyl, etc. Radicals included by R" are, for example, alkylenearylene radicals such as

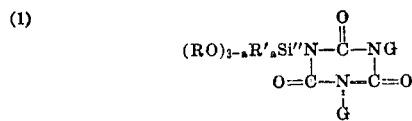

etc; alkylene radicals such as ethylene, propylene, butylene, etc.; cycloalkylene radicals such as cyclopropylene, cyclobutylene, cyclopentylene, cylohexylene, etc. Halogenated R" radicals also are included such as 1-chloroethylene etc. Radicals included by G are all of the aforementioned R' radicals, trimethoxysilylethylene, dimethoxymethylsilylcyclohexylene, trimethylsilylethylene, diphenylethoxysilyl-ethylenephenylene, etc.; styryl, vinyl, allyl, chloroallyl, cyclohexenyl, etc. In Formula 1 where R, R', R" and G respectively, can be more than one radical, these radicals can be all the same or any two or more of the aforementioned radicals.

Included by the silylisocyanurates of Formula 1 are, for example, monosilylisocyanurates of the formula,

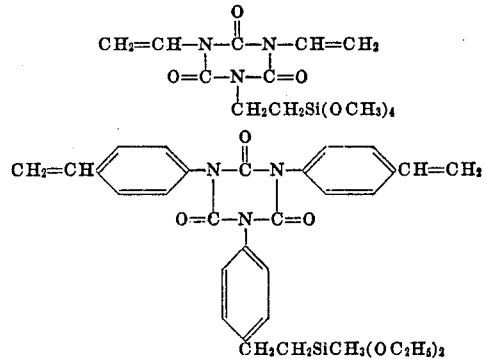

disilylisocyanurates of the formula,

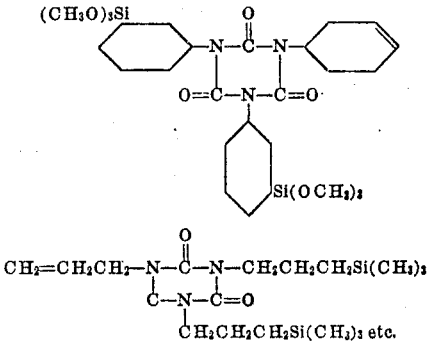

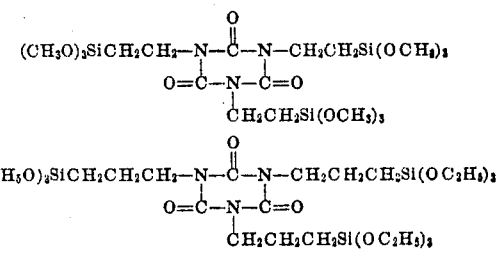

and trisilylisocyanurates

etc.

The silylisocyanurates of Formula 1 can be made by effecting reaction between a siliconhydride of the formula, (2)     $(RO)_{3-a}R'_aSiH$ and an aliphatically unsaturated isocyanurate of the formula, (3)

$$R'''N-\overset{O}{\overset{\|}{C}}-NJ$$
$$O=C-N-C=O$$
$$\underset{J}{|}$$

in the presence of an effective amount of a platinum catalyst, where R, and R' are as previously defined R''' is selected from monovalent aliphatically unsaturated hydrocarbon radicals and halogenated monovalent aliphatically unsaturated hydrocarbon radicals, and J is selected from R' radicals and R''' radicals.

Methods for making the silicon hydride of Formula 2 are well known, as shown in Organosilicon Compounds by Earborn, page 294 (1960), Butterworth Scientific Publications. A method for making aliphatically unsaturated isocyanurates of Formula 3 is shown by S. Herbsman, Journal of Organic Chemistry, vol. 30, p. 1259 (April 1965), utilizing the appropriate aliphatically unsaturated isocyanate.

As shown in my copending application Ser. No. 669,298, filed concurrently herewith and assigned to the same assignee as the present invention, trisilylisocyanurates also can be made by effecting reaction between a silylorganohalide and a metal cyanate in the presence of an aprotic solvent. There is an immediate cyclization of the resulting silylorganoisocyanate as it forms to produce the corresponding trisilylisocyanurate.

The silylisocyanurates of the present invention can be employed as glass sizing materials. In addition, the silylisocyanurates can be employed for making composites with silicon rubber and various substrates, such as concrete, plywood, etc.

In the practice of the invention, addition is effected between the silicon hydride of Formula 2, and the aliphatically unsaturated isocyanurate of Formula 3 in the presence of a platinum catalyst. Depending upon the degree of silyl substitution desired in the isocyanurate, there can be employed from about 1 to 3 moles of the silicon hydride, per mole of the aliphatically unsaturated isocyanurate. For example, equal molar amounts of the silicon hydride and the aliphatically unsaturated isocyanurate can favor the formation of the monosilylisocyanurate. Although the order of addition of the various reactants is not critical, the degree of silylation of the aliphatically unsaturated isocyanurate also can be influenced if the hydrosilation is conducted in the presence of an excess of either of the reactants. A higher degree of silylation can be favored for example, if the aliphatically unsaturated isocyanurate is added to the silicon hydride in the presence of the platinum catalyst. Temperatures in the range of between 25° C. to 150° C. have been found effective. It is preferred, however, to utilize temperatures between 85° C. to 100° C. Platinum catalysts which can be employed are, for example, chloroplatinic acid, platinum-olefin complexes, as shown in Ashby Pat. 3,159,662, platinum complexes shown by Lamoreaux Pat. 3,220,972, both patents being assigned to the same assignee as the present invention, etc. An effective amount of platinum catalyst is that amount which is sufficient to provide from .01 to 500 parts of platinum, per million parts of hydrosilation mixture. Recovery of the desired product can be achieved by standard recovery procedures such as a distillation, etc. Fractionation of the resulting mixture by standard procedures will provide for separation of the various components.

In order that those skilled in the art will be better able to practice the invention the following examples will be given by way of illustration and not by way of limitation. All parts are by weight.

EXAMPLE 1

There was added 122 parts of trimethoxysilane to a mixture at 100° C. of 124 parts of triallylisocyanurate and .05 part of platinum, in the form of a chloroplatinic acid complex. The reaction temperature was maintained by the rate of addition of the silicon hydride to the triallylisocyanurate. When the addition was complete, a vapor phase chromatograph of the mixture showed the presence of silylisocyanurate adducts. Fractionation of the mixture resulted in the recovery of a 42% yield of product boiling at 182° C.–184° C. at 1.4 mm. Hg. Based on its method of preparation, and its nuclear magnetic resonance spectrum, the product was 1 - trimethoxysilylpropyl-3,5-diallylisocyanurate.

EXAMPLE 2

Trimethoxysilane was added to a mixture at about 100° C. of triallylisocyanurate, in the presence of an effective amount of a platinum catalyst. Sufficient trimethoxysilane was employed to provide for a ratio of 2 moles of trimethoxysilane, per mole of triallylisocyanurate. After the addition was completed, there was obtained a 40% yield of 1,3-bis(trimethoxysilylpropyl)5-allylisocyanurate boiling at 214–216° C. at 0.25 mm. Hg. The identity of the compound was confirmed by its nuclear magnetic resonance spectrum, with respect to the ratio of allyl radicals to trimethoxysilylpropyl radicals. Theory 0.5; Found 0.51.

EXAMPLE 3

Following the procedure of Example 1, three moles of trimethoxysilane per mole of triallylisocyanurate in the presence of 0.1 part of platinum, in the form of a chloroplatinic acid complex, resulted in the production of 1,3,5-tris(trimethoxysilylpropyl)isocyanaurate. A 40% yield of product was obtained. It had a boiling range of 245–259° C. The identity of the product was confirmed by its infrared spectrum, showing the absence of aliphatic unsaturation.

Two parts of tris(trimethoxysilylpropyl)isocyanurate was employed in combination with a mixture of 100 parts of a silanol-terminated polydimethylsiloxane, 150 parts of silica filler, and 0.8 part of a curing catalyst, taught by Berridge in Pat. 2,843,555, assigned to the same assignee as the present invention. A plywood composite, using two 2" x 6" strips, was made with the resulting room temperature vulcanizing composition. After a three day cure a force of 190 p.s.i. was required to separate the plywood strips. A plywood composite made in the same manner with the same composition free of tris(trimethoxysilylpropyl)isocyanurate, required a force of only 30 p.s.i. to separate the plywood strips.

EXAMPLE 4

There is added to 134 parts of phenyldiethoxysilane and 0.1 part of platinum, as a chloroplatinic acid solution, in isopropanol at 100° C., 128 parts of 1-allyl-3,4-di-n-propylisocyanurate. Initial contact of the isocyanurate with the silane is very exothermic. Temperature control is maintained by rate of addition, along with the intermittent use of an external heat source. Following complete addition, a vapor phase chromatograph of a portion of the reaction mixture shows the formation of an adduct. The temperature of the mixture is maintained at 110° C. for an additional 3 hours. The reaction is then fractionated. There is recovered 1-phenyldiethoxysilyl,3,4-di-n-propylisocyanurate. Its identity is confirmed by its infrared spectrum.

While the foregoing examples have of necessity been limited to only a few of the very many variables within the scope of the present invention, it should be understood that the present invention covers a much broader class of silylisocyanurates as shown by Formula 1, and a method for making these materials by effecting reaction between a silicon hydride of Formula 2 and an aliphatically unsaturated isocyanurate of Formula 3.

What I claim as new and desire to secure by Letters Patent of the United States is:

1. Isocyanurate of the formula,

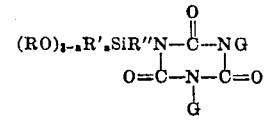

where R is an alkyl radical having from 1 to 8 carbon atoms, R' is a member selected from the class consisting of alkyl and halogenated alkyl radicals having from 1 to 8 carbon atoms, phenyl, tolyl, chlorophenyl, xylyl, naphthyl, chloronaphthyl, phenethyl, and benzyl radicals, and cycloalkyl radicals having from 4 to 7 carbon atoms; R'' is selected from the class consisting of alkylene and halogenated alkylene radicals having from 2 to 8 carbon atoms, the phenyleneethylene radical and cycloalkylene radicals having from 3 to 7 carbon atoms; G is selected from the class consisting of R' radicals, $(RO)_{3-a}R'_aSiR''$ radicals, styryl, vinyl, allyl, chloroallyl, and cyclohexenyl radicals, and $a$ is a whole number equal to 0 to 3, inclusive.

2. 1-trimethoxysilylpropyl - 3,5-diallylisocyanurate, in accordance with claim 1.

3. 1,3-bis(trimethoxysilylpropyl)5-allylisocyanurate, in accordance with claim 1.

4. 1,3,5-tris(trimethoxysilylpropyl)isocyanurate in accordance with claim 1.

References Cited

UNITED STATES PATENTS

| | | | |
|---|---|---|---|
| 2,637,738 | 5/1953 | Wagner | 260—448.2 |
| 2,823,218 | 2/1958 | Speier | 260—448.2 |
| 2,883,397 | 4/1959 | Bailey | 260—448.2 XR |
| 2,971,970 | 2/1961 | Bluestein | 260—448.2 |
| 3,274,128 | 9/1966 | Johns | 260—248 |
| 3,278,492 | 10/1966 | Herbstman | 260—248 XR |

HENRY R. JILES, Primary Examiner

J. M. FORD, Assistant Examiner

U.S. Cl. X.R.

106—52, 90, 120; 156—329; 260—825